（12） United States Patent
Berger et al.

(10) Patent No.: US 9,197,053 B2
(45) Date of Patent: Nov. 24, 2015

(54) RETRACTABLE INTERCONNECT DEVICE INCLUDING MULTIPLE ELECTRICAL PATHS

(71) Applicant: International Business Machines Corporation, Armonk, NY (US)

(72) Inventors: Darcy Berger, Rochester, MN (US); John R. Dangler, Rochester, MN (US); Matthew S. Doyle, Rochester, MN (US); Jesse Hefner, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 117 days.

(21) Appl. No.: 14/153,483

(22) Filed: Jan. 13, 2014

(65) Prior Publication Data

US 2015/0200528 A1    Jul. 16, 2015

(51) Int. Cl.
*H01R 13/72* (2006.01)
*H02G 11/02* (2006.01)

(52) U.S. Cl.
CPC .............. *H02G 11/02* (2013.01); *H01R 13/72* (2013.01)

(58) Field of Classification Search
CPC ................................ H02G 11/02; H01R 13/72
USPC .............. 439/501, 4; 191/12 R, 12.2 R, 12.4
See application file for complete search history.

(56) References Cited

U.S. PATENT DOCUMENTS

| | | | | |
|---|---|---|---|---|
| 3,853,285 | A * | 12/1974 | Woodring | 242/378.1 |
| 5,526,997 | A * | 6/1996 | Karczmer | 242/388.5 |
| 5,562,488 | A * | 10/1996 | Neiser et al. | 439/501 |
| 5,593,316 | A * | 1/1997 | Lyons | 439/501 |
| 5,924,892 | A * | 7/1999 | Ferracina | 439/501 |
| 6,234,831 | B1 * | 5/2001 | Hanaoka | 439/501 |
| 6,253,893 | B1 * | 7/2001 | Chi-Min | 191/12.4 |
| 6,359,764 | B1 | 3/2002 | Chou | |
| 6,386,906 | B1 * | 5/2002 | Burke | 439/501 |
| 6,401,892 | B1 * | 6/2002 | Chang | 191/12.4 |
| 6,495,756 | B1 | 12/2002 | Burke et al. | |
| 6,702,077 | B2 * | 3/2004 | Skowronski | 191/12.2 R |
| 6,794,577 | B1 | 9/2004 | Bhogal | |
| 6,926,130 | B2 * | 8/2005 | Skowronski | 191/12.2 R |
| 7,017,846 | B2 | 3/2006 | Tsoi et al. | |
| 7,038,138 | B2 | 5/2006 | Laity et al. | |
| 7,726,823 | B2 | 6/2010 | Rus et al. | |
| 7,901,241 | B1 | 3/2011 | Larkin | |
| 8,075,335 | B2 | 12/2011 | Burke et al. | |
| 8,633,386 | B2 * | 1/2014 | Gong et al. | 174/69 |
| 8,802,991 | B1 * | 8/2014 | Hua et al. | 174/135 |
| 2011/0051341 | A1 | 3/2011 | Baldassano et al. | |
| 2011/0215759 | A1 * | 9/2011 | Lee et al. | 320/115 |
| 2011/0300744 | A1 * | 12/2011 | Garry | 439/501 |
| 2012/0034816 | A1 * | 2/2012 | Woods | 439/501 |
| 2013/0084734 | A1 * | 4/2013 | Su | 439/501 |
| 2013/0102186 | A1 * | 4/2013 | Fu et al. | 439/501 |

* cited by examiner

*Primary Examiner* — Abdullah Riyami
*Assistant Examiner* — Nelson R Burgos-Guntin
(74) *Attorney, Agent, or Firm* — Toler Law Group, P.C.

(57) ABSTRACT

A retractable interconnect device is configurable to operate in an extended mode or a retracted mode. The retractable interconnect device includes a first (e.g., short) electrical path and a second (e.g., long) electrical path. The retractable interconnect device also includes a connector that is electrically coupled to the second electrical path and that is selectively electrically couplable to the first electrical path.

20 Claims, 9 Drawing Sheets

RETRACTABLE INTERCONNECT DEVICE INCLUDING MULTIPLE ELECTRICAL PATHS

FIELD

The present disclosure is generally related to a retractable interconnect device.

DESCRIPTION OF RELATED ART

Electronic devices, such as computers, modems, facsimile machines, and mobile devices, are often connected with each other via communication cables. When a distance between two electrical devices is large, a long communication cable is often required. When the electrical devices are close to each other, a short communication cable can be used.

To accommodate both situations, a retractable cable can be used. The retractable cable may be extended when used to connect devices a long distance apart. The retractable cable may be retracted when used to connect devices that are a short distance apart. The amount (e.g., length) of cable between the devices may be fixed, regardless of whether the retractable cable is fully extended, partially extended, or fully retracted. Thus, even in situations where the devices are relatively close, signals traveling between the devices may travel the entire length of the retractable cable.

SUMMARY

This disclosure presents particular embodiments of a retractable interconnect device that is configurable to operate in an extended mode and in a retracted mode. The retractable interconnect device includes multiple electrical paths of varying length. For example, the retractable interconnect device may have a short electrical path and a long electrical path. When the retractable interconnect device is in the extended mode, the long electrical path can be used to conduct signals between electrical devices. When the retractable interconnect device is in the retracted mode, the short electrical path can be used to conduct signals instead of the long electrical path. Using a shorter electrical path when in the retracted mode can provide increased data transmission speed between the electrical devices. Alternately, when the retractable device is in the retracted mode, the short electrical path can be used in addition to the long electrical path. Using multiple electrical paths when in the retracted mode can increase data transmission bandwidth between the electrical devices.

In a particular embodiment, an apparatus includes a retractable interconnect device that is configurable to operate in an extended mode or in a retracted mode. The retractable interconnect device includes a first electrical path and a second electrical path that is longer than the first electrical path. The second electrical path is extensible when the retractable interconnect device is in the retracted mode and is retractable when the retractable interconnect device is in the extended mode. The retractable interconnect device also includes a connector that is electrically coupled to the second electrical path and that is selectively electrically couplable to the first electrical path.

In another particular embodiment, a retractable interconnect device includes a short flex cable, a long flex cable, and an extending and retracting mechanism configured to transition between an extended mode and a retracted mode. The device also includes a connector that is electrically coupled to the long flex cable and that is selectively electrically couplable to the short flex cable.

In another particular embodiment, a method of interconnecting electrical devices includes, while a retractable interconnect device is in a retracted mode, conducting electrical signals between a first connector of the retractable interconnect device and a second connector of the retractable interconnect device via a first electrical path of the retractable interconnect device and via a second electrical path of the retractable interconnect device. The method also includes, while the retractable interconnect device is in an extended mode, conducting electrical signals between the first connector and the second connector via the second electrical path but not the first electrical path.

One particular advantage provided by at least one of the disclosed embodiments is that a retractable interconnect device is capable of providing multiple electrical paths (e.g., the short electrical path and the long electrical path) when operating in a retracted mode. Thus, a higher transmission bandwidth between electrical devices can be achieved in the retracted mode as compared to an interconnect device in which the same fixed-length electrical path is used for communication regardless of whether the electrical path is partially extended, fully extended, or fully retracted.

Another advantage provided by at least one of the disclosed embodiments is that a retractable interconnect device is capable of switching between a long electrical path and a short electrical path depending on whether the retractable interconnect device is operating in an extended mode or a retracted mode. Switching to the short electrical path when operating in the retracted mode may result in a lower communication latency between electrical devices that are connected to the ends of the short electrical path.

Other aspects, advantages, and features of the present disclosure will become apparent after review of the entire application, including the following sections: Brief Description of the Drawings, Detailed Description, and the Claims.

DETAILED DESCRIPTION

This document relates generally to a retractable interconnect device that is configurable to operate in an extended mode or in a retracted mode. The retractable interconnect device includes a first (e.g., short) electrical path and a second (e.g., long) electrical path. The second electrical path can be extended and retracted. The retractable interconnect device may be configured or may operate in the extended mode when the second electrical path is at least partially extended, and the retractable interconnect device may be configured or may operate in the retracted mode when the second electrical path is fully retracted. The retractable interconnect device also includes a connector. In a first embodiment, the connector is electrically coupled to the second (e.g., long) electrical path in both the extended mode and the retracted mode. In the retracted mode, the connector is also coupled to the first (e.g., short) electrical path. In the extended mode, the connector is electrically isolated from the first electrical path. Thus, in the first embodiment, the retractable interconnect device provides multiple electrical paths when in the retracted mode, which may provide increased data transmission bandwidth as compared to a single-path retractable device.

In a second embodiment, the connector is configured to be electrically coupled to a single path at a time. In the extended mode, the connector is electrically coupled to the second (e.g., long) electrical path and electrically isolated from the first (e.g., short) electrical path. In the retracted mode, the connector is electrically coupled to the first electrical path and is electrically isolated from the second electrical path. Thus, in the second embodiment, the retractable interconnect device provides a shorter electrical path in the retracted mode, which may provide increased transmission speed as compared to a single-path retractable device.

Figure 1:
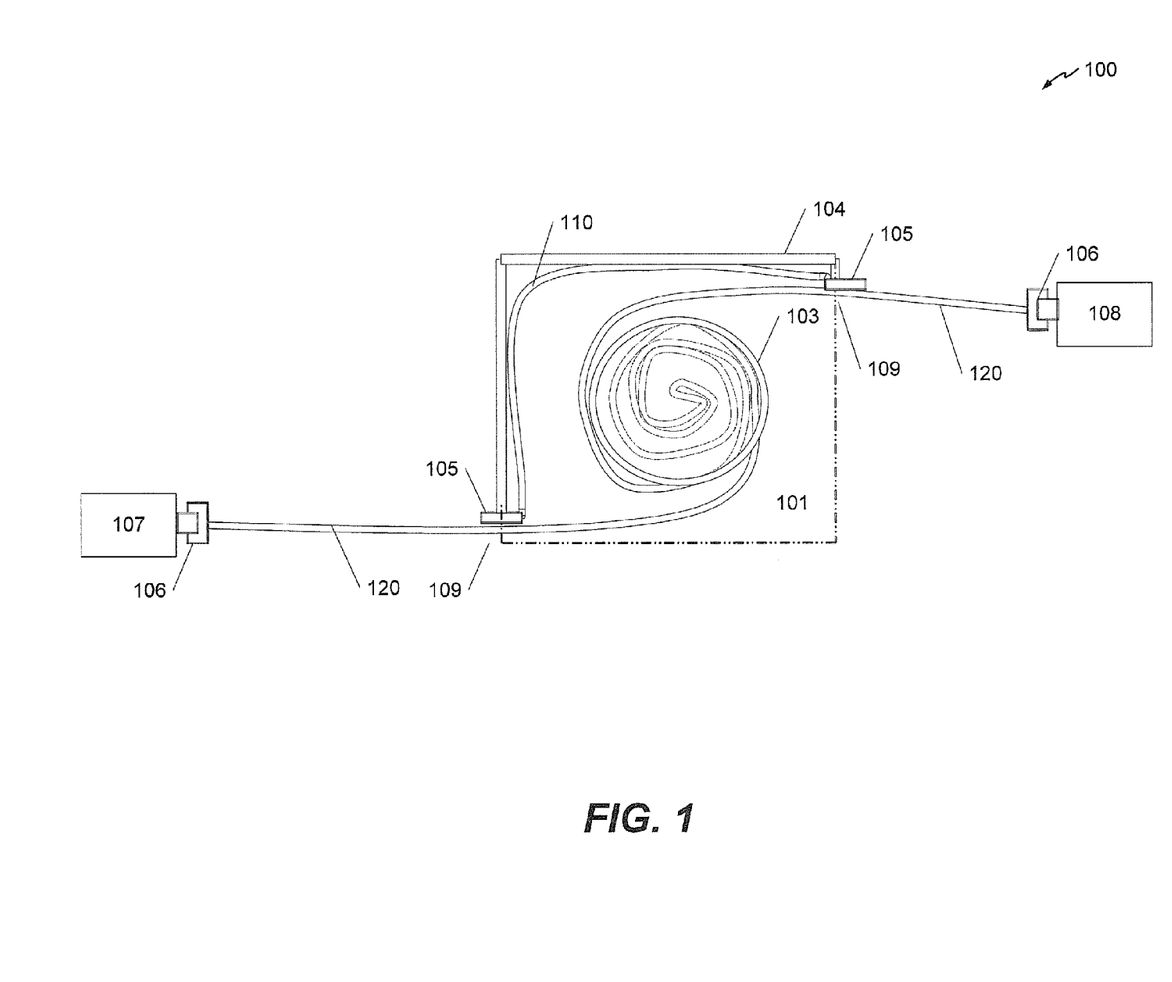
FIG. 1 is a diagram with a cross-sectional view that illustrates a particular illustrative embodiment of a retractable interconnect device.

Referring to FIG. 1, a particular embodiment of a retractable interconnect device is disclosed and generally designated 100. The retractable interconnect device 100 includes a short electrical path 110 and a long electrical path 120. As used herein, an "electrical path" includes a wire or other conductive material that, when connected between electrical devices, can be used to conduct electrical signals between the electrical devices. The "electrical path" may also refer to insulating portions surrounding the wire.

The retractable interconnect device 100 may also include an extending and retracting mechanism 103 and a housing 104. A position of the short electrical path 110 may be fixed within the housing 104. For example, the short electrical path 110 may be attached to one or more walls of the housing 104, as shown in FIG. 1. The short electrical path 110 may include a single wire, multiple wires (e.g., a flex cable), a twisted pair cable, a coaxial cable, another type of cable, or any combination thereof.

The long electrical path 120 may be extended outside the housing, as shown in FIG. 1, using the extending and retracting mechanism 103. For example, the extending and retracting mechanism 103 may receive and wind the long electrical path 120 when the long electrical path 120 is retracted. The long electrical path 120 may include a single wire, multiple wires (e.g., a flex cable), a twisted pair cable, a coaxial cable, another type of cable, or any combination thereof. The extending and retracting mechanism 103 may be configured to cause the retractable interconnect device 100 to transition from a retracted mode (in which the long electrical path 120 is fully retracted) to an extended mode (in which the long electrical path 120 is at least partially extended), and vice versa.

In a particular embodiment, the extending and retracting mechanism 103 includes a winding spool that is pivotally connected to the housing 104 within a receiving space 101 of the housing 104 and is configured to receive and wind the long electrical path 120 when the long electrical path 120 is retracted. The extending and retracting mechanism 103 may also include a spiral spring that is configured to store elastic energy when the long electrical path 120 is extended and to release the stored elastic energy to retract the long electrical path 120. Thus, the housing 104 is a structure that contains the short electrical path 110, the extending and retracting mechanism 103, and a retracted part of the long electrical path 120. The housing 104 may include opening(s) so that component(s) within the housing 104 are exposed, visible, and/or accessible.

The retractable interconnect device 100 may include a pair of first connectors 105 and a pair of second connectors 106. The first connectors 105 may be immobile (e.g., fixed to the housing 104) and may be fixedly attached to ends of the short electrical path 110. As used herein, a connection that is "fixedly" attached may be a connection that is designed to remain in place during normal operation and to withstand normal wear and tear. For example, one of the first connectors 105 may be attached to a first end of the short electrical path 110 and the other of the first connectors 105 may be attached to a second end of the short electrical path 110.

The second connectors 106 may be mobile (e.g., may be pulled away from the housing 104 by a user) and may be attached to ends of the long electrical path 120. For example, one of the second connectors 106 may be attached to a first end of the long electrical path 120 and the other of the second connectors 106 may be attached to a second end of the long electrical path 120. The second connectors 106 can be connected to external electrical devices 107 and 108, as shown in FIG. 1. The electrical devices 107 and 108 may include a computer, a server, a server chassis, etc. Alternately, the electrical devices 107 and 108 may be components of a single computing device, such as a bus bridge, a hard drive, a peripheral device, an input device, an output device, etc.

In a particular embodiment, the first connectors 105 may act as an electrical conduit between the short electrical path 110 and the second connectors 106, and the second connectors 106 may be selectively electrically couplable to the short electrical path 110, as further described with reference to FIGS. 3-6. When the retractable interconnect device 100 is in the extended mode, as shown in FIG. 1, the first connectors 105 are electrically isolated from second connectors 106. Thus, in the extended mode, the short electrical path 110 is not electrically couplable to the electrical devices 107 and 108. When the retractable interconnect device 100 is in the retracted mode, the second connectors 106 are proximate to the first connectors 105. In a particular embodiment, the first connectors 105 and the second connectors 106 become automatically electrically coupled to each other in the retracted mode (e.g., the connectors may be magnetic). Alternately, a user may electrically couple (e.g., "snap together") the first connectors 105 to the second connectors 106 to activate the retracted mode. As further described herein with reference to FIGS. 3-6, based on a structure of the first connectors 105 and the second connectors 106, the long electrical path 120 may either remain connected to the electrical devices 107-108 in the retracted mode or may be disconnected from the electrical devices 107-108 in the retracted mode.

During operation, when the retractable interconnect device 100 is used to connect the first electrical device 107 to the second electrical device 108 over a relatively long distance (e.g., a distance greater than a width of the housing 104), the long electrical path 120 is extended (e.g., pulled out by a user) from the housing 104 to reach the electrical devices 107-108. Thus, when the electrical devices 107 and 108 are separated over a relatively long distance, the retractable interconnect device 100 may operate in the extended mode. In the extended mode, the second connectors 106 may be inserted (e.g., by a user) into corresponding (e.g., mating) connectors of the first electrical device 107 and the second electrical device 108, and the long electrical path 120 may act as a conductive bridge to communicate data between the first electrical device 107 and the second electrical device 108. In the extended mode, the first connectors 105, which are coupled to the short electrical path 110, may be electrically isolated from the second connectors 106 due to the separation between the first connectors 105 and the second connectors 106.

When the retractable interconnect device 100 is used to connect the first electrical device 107 to the second electrical device 108 over a relatively short distance (e.g., a distance approximately less than or equal to a width of the housing 104), the long electrical path 120 may be fully retracted. Thus, when the electrical devices 107 and 108 are separated by a relatively short distance, the retractable interconnect device 100 may operate in the retracted mode. In the retracted mode, the second connectors 106 may become automatically electrically coupled to the first connectors 105 or may be electrically coupled to the first connectors 105 by a user that pushes the connectors together.

In a particular embodiment, as further described with reference to FIGS. 3-4, when the first connectors 105 become electrically coupled to the second connectors 106, the short electrical path 110 becomes electrically coupled to the electrical devices 107-108 while the long electrical path 120 remains electrically coupled to the electrical devices 107-108. Thus, in such an embodiment, both the short electrical path 110 and the long electrical path 120 conduct signals between the electrical devices 107-108 in the retracted mode. The availability of multiple electrical paths in the retracted mode may increase data transmission speed and/or a number of available communication channels between the electrical devices 107-108.

In an alternate embodiment, as further described with reference to FIGS. 5-6, when the first connectors 105 become electrically coupled to the second connectors 106, the short electrical path 110 becomes electrically coupled to the electrical devices 107-108 and the long electrical path 120 becomes electrically isolated from the electrical devices 107-108. Thus, in such an embodiment, communication becomes available via the short electrical path 110 instead of the long electrical path 120 in the retracted mode. Such "switching" from the long electrical path 120 to the short electrical path 110 (e.g., after the retractable interconnect device 100 transitions from the extended mode to the retracted mode) may decrease a communication latency between the electrical devices 107-108, because the short electrical path 110 has a shorter length than the long electrical path 120.

It should be noted that although the embodiment of FIG. 1 illustrates the retractable interconnect device 100 being extensible on both sides, in alternate embodiments the retractable interconnect device 100 may be extensible on a single side. For example, one side of the retractable interconnect device 100 may be integrated with or a component of an electrical device. To illustrate, the retractable interconnect device 100 may include two first connectors 105 but only a single second connector 106, and one of the two first connectors 105 may be fixedly attached to an electrical device. The other of the first connectors 105 may be electrically coupled to the second connector 106 (e.g., automatically or by a user) when the retractable interconnect device 100 operates in the retracted mode and may be electrically isolated from the second connector 106 when the retractable interconnect device 100 operates in the extended mode.

Figure 2:
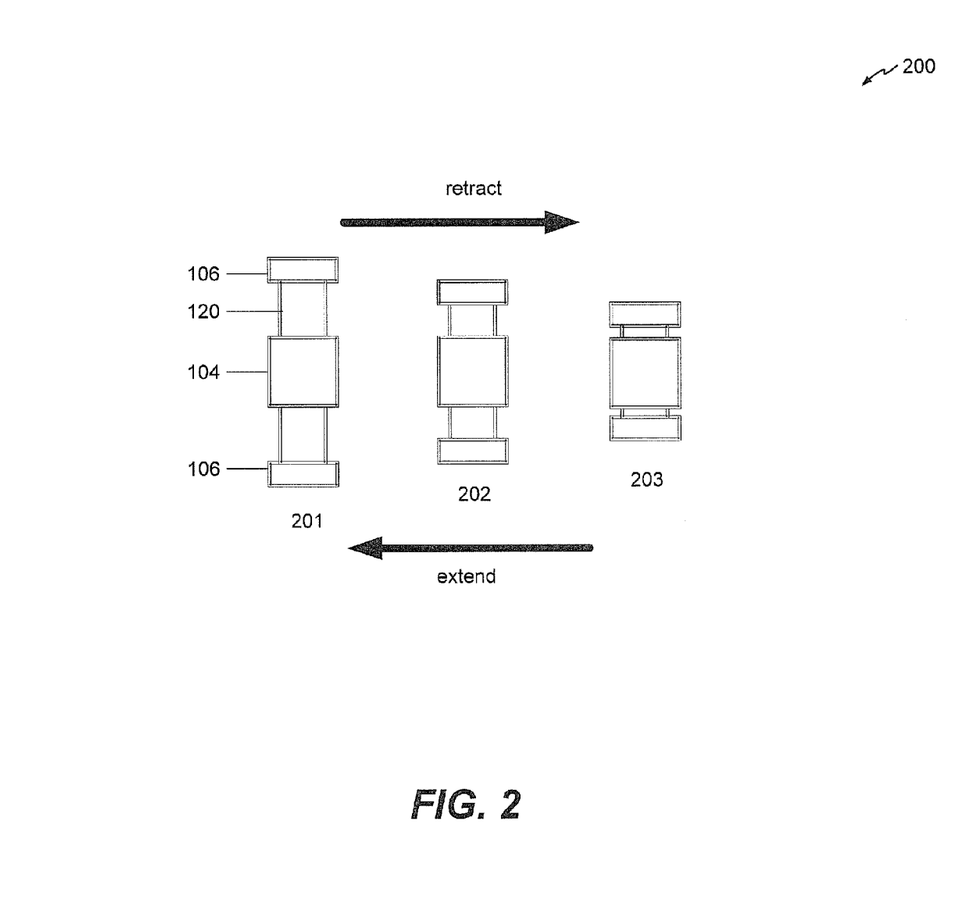
FIG. 2 is a diagram with a top view that illustrates a particular illustrative embodiment of the retractable interconnect device of FIG. 1.

Referring to FIG. 2, a top view of a particular embodiment of the retractable interconnect device 100 is disclosed and generally designated 200. As shown in FIG. 2, the retractable interconnect device 100 may be fully extended, as shown at 201, partially extended, as shown at 202, and fully retracted, as shown at 203. The retractable interconnect device 100 being fully or partially extended corresponds to the extended mode described with reference to FIG. 1. The retractable interconnect device 100 being fully retracted corresponds to the retracted mode described with reference to FIG. 1.

Figure 3:
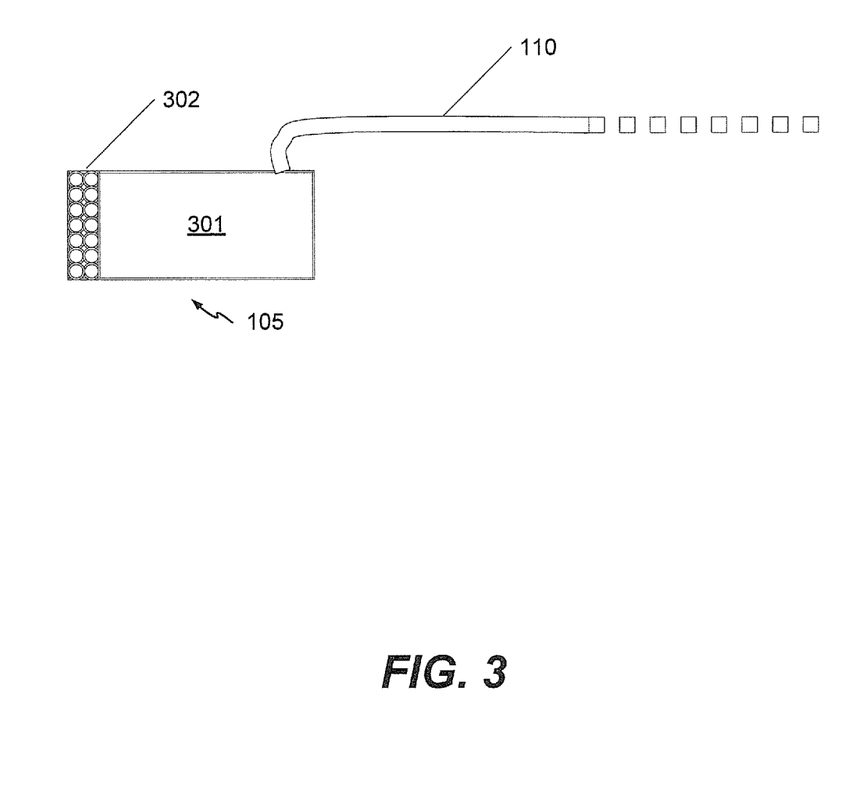
FIG. 3 is a diagram that illustrates a particular illustrative embodiment of a first connector of the retractable interconnect device of FIG. 1.
Figure 4:
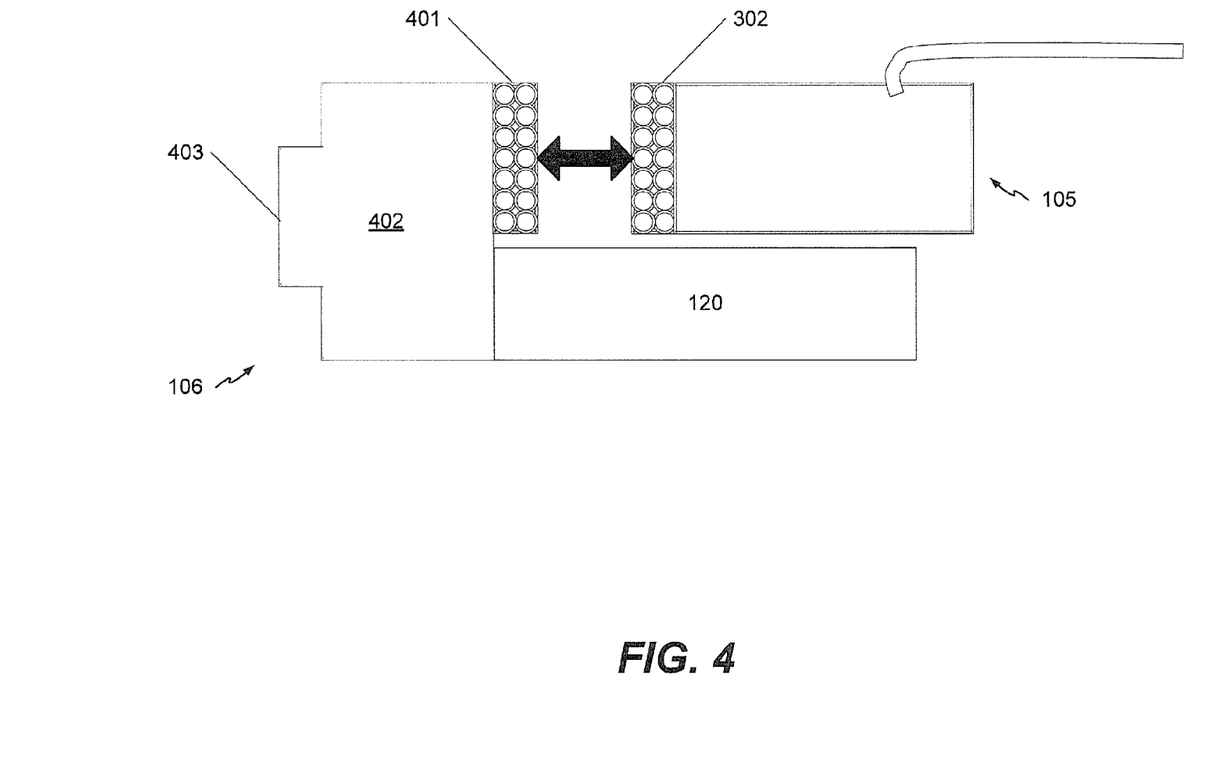
FIG. 4 is a diagram that illustrates a particular illustrative embodiment of a second connector of the retractable interconnect device of FIG. 1.

FIGS. 3-4 illustrate particular examples of the first connector 105 and the second connector 106 in an embodiment in which the retractable interconnect device 100 enables communication via multiple electrical paths (e.g., both the short electrical path 110 and the long electrical path 120) when operating in the retracted mode. In FIG. 3, the first connector 105 includes a first connecting body 301 and a first interface 302. The first connector 105 is coupled to the short electrical path 110, as shown. When the retractable interconnect device 100 is in the retracted mode, the first connector 105 may be electrically coupled (e.g., automatically or by a user) to the second connector 106 via the interface 302, as further described with reference to FIG. 4. In a particular embodiment, the first connecting body 301 includes a group of wires soldered onto the first interface 302. In a particular embodiment, the first interface 302 is a land grid array (LGA) interface.

In FIG. 4, the second connector 106 includes a second interface 401 (e.g., a LGA interface), a second connecting body 402, and a connecting port 403. In a particular embodiment, the second connecting body 402 includes a group of wires soldered to a group of wires of the long electrical path 120. The connecting port 403 may be configured to connect to a corresponding (e.g., mating) connector of an electrical device, such as the electrical device 107 or the electrical device 108 of FIG. 1. The second connector 106 may be fixedly attached to the long electrical path 120, as shown. The connecting port 403 may include a group of pins or may include a group of connectors configured to receive pins of the first electrical device 107 or the second electrical device 108.

The second interface 401 may form an electrical connection with (e.g., may become electrically coupled to) the first interface 302 of FIG. 3 when the retractable interconnect device 100 is in the retracted mode. The electrical connection may be formed automatically when the long electrical path 120 is fully retracted or may be performed manually by a user (e.g., by "snapping" the connectors 105-106 together). To illustrate how such a connection may be formed, the first connector 105 of FIG. 3 is shown in FIG. 4 using a dashed line.

Thus, in the embodiment illustrated in FIGS. 3-4, in response to a transition of the retractable interconnect device 100 from the extended mode to the retracted mode, the second connector 106 becomes electrically coupled to the short electrical path 110 in addition to being electrically coupled to the long electrical path 120. In response to a transition of the retractable interconnect device 100 from the retracted mode to the extended mode, the short electrical path 110 becomes electrically isolated from the second connector 106 due to the disconnection of the interfaces 302 and 401.

Figure 5:
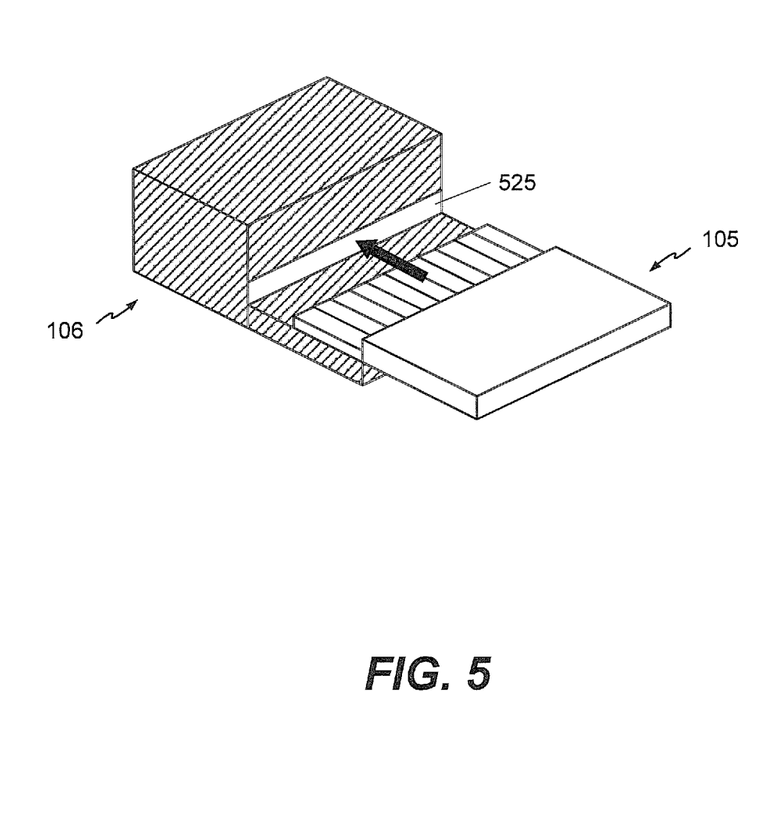
FIG. 5 is a perspective view that illustrates another particular illustrative embodiment of a first connector of the retractable interconnect device of FIG. 1.
Figure 6:
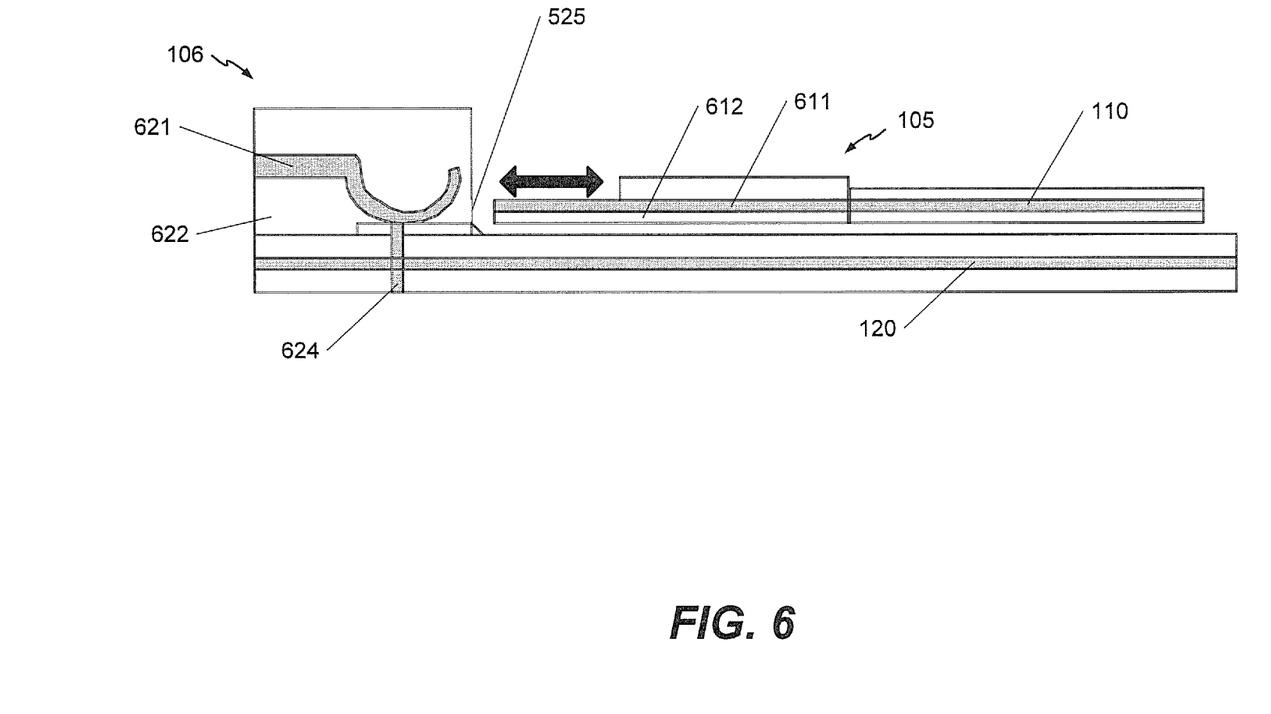
FIG. 6 is a side, cross-sectional view that illustrates another particular illustrative embodiment of a second connector of the retractable interconnect device of FIG. 1.

FIGS. 5-6 illustrate particular examples of the first connector 105 and the second connector 106 in an embodiment in which the retractable interconnect device 100 switches communication between electrical paths (e.g., between the short electrical path 110 and the long electrical path 120). As shown in FIG. 5, in the retracted mode, the first connector 105 may be inserted into a receptacle 525 of the second connector 106. For ease of illustration, the outer surfaces of the second connector 106 are shown using a hatching pattern.

Referring to FIG. 6, conducting elements are shown in gray and non-conducting elements are shown in white. When the retractable interconnect device 100 is in the extended mode, a connector pin (e.g., a mating connector) 621 of the second connector 106 is in electrical contact with (e.g., electrically coupled to) the long electrical path 120 by way of a conductive via 624. When the retractable interconnect device is in the retracted mode, the first connector 105 is inserted into a body 622 of the second connector 106 through the receptacle 525, and the connector pin 621 is automatically lifted to accommodate the first connector 105. The connector pin 621 becomes electrically coupled to the short electrical path 110 via a conductive element 611 of the first connector 105. Further, the connection between the connector pin 621 and the long electrical path 120 is broken due to the presence of an insulating element 612 of the first connector 105. In the retracted mode, the long electrical path 120 becomes electrically isolated from the connector pin 621.

Thus, in the embodiment illustrated in FIGS. 5-6, in response to a transition of the retractable interconnect device 100 from the extended mode to the retracted mode, the connector pin 621 becomes electrically coupled to the short electrical path 110 via the conductive element 611 and becomes electrically isolated from the long electrical path by the insulating element 612. In response to a transition from the retracted mode to the extended mode, the connector pin 621 becomes electrically coupled by the conductive via 624 to the long electrical path 120 and becomes electrically isolated from the short electrical path 110.

In a particular embodiment, the retractable interconnect device 100 is configured to transition from the extended mode to the retracted mode, and vice versa, without causing an interruption in communication between electrical devices. For example, one or both of the electrical devices (e.g., the electrical devices 107-108) connected via the retractable interconnect device 100 may be configured to determine whether communication is available via the short electrical path 110, the long electrical path 120, or both. The electrical device(s) may accordingly adjust a number of communication channels and/or communication speed in the electrical path(s) 110, 120. The electrical paths 110, 120 may have the same number of channels or may have different numbers of channels. To illustrate, the electrical devices may typically be separated by a distance that is short enough to enable the retractable interconnect device 100 to operate in the retracted mode. When the electrical devices are moved farther apart (e.g., during repairs or other operations), the retractable interconnect device 100 may transition to from the retracted mode to the extended mode, and the electrical devices may still be able to communicate. When the electrical devices are moved back to their original positions (e.g., at the conclusion of the repair operation), the retractable interconnect device 100 may transition from the extended mode back to the retracted mode.

Figure 7:
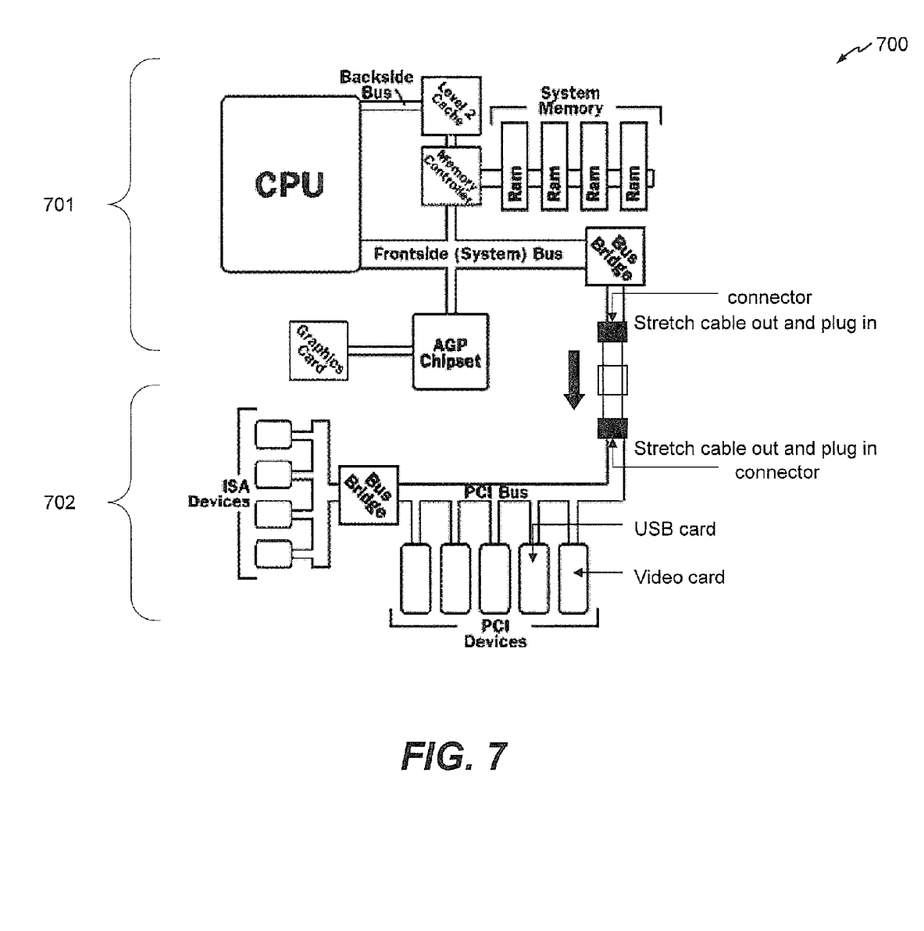
FIG. 7 is a block diagram that illustrates a particular illustrative embodiment of an application of a retractable interconnect device for use in a computer system.

Referring to FIG. 7, a particular embodiment of an application of the retractable interconnect device 100 is disclosed and generally designated 700. The retractable interconnect device 100 of FIG. 1 may be applied to connect a first electrical device 701 with a second electrical device 702 for data transmission. In an illustrative embodiment, the first electrical device 701 and the second electrical device 702 may be the first electrical device 107 and the second electrical device 108 of FIG. 1, respectively.

The first electrical device 701 may be a computing device (or portion thereof) that includes a CPU, a system memory, and other components. The second electrical device 702 may include a series of peripheral component interconnect (PCI) slots connected through a PCI bus. The PCI slots may host PCI cards, such as a universal serial bus (USB) card and a video card. The USB card may host a device, such as a mobile phone, a portable media player, a tablet computer, a USB hard drive, a USB mouse, or a USB keyboard. The video card may host a device, such as a monitor. The second electrical device 702 may include a series of industry standard architecture (ISA) devices connected through an ISA bus. The PCI bus and the ISA bus may be connected by a bus bridge.

It should be noted that the first electrical device 107 and the second electrical device 108 are not limited to the first electrical device 701 and the second electrical device 702 shown in FIG. 7. The first electrical device 107 and the second electrical device 108 can be any type devices capable of communicating with each other. The retractable interconnect device may be used to connect buses within a computer, as shown in FIG. 7, or may be used to connect other types of devices.

Figure 8:
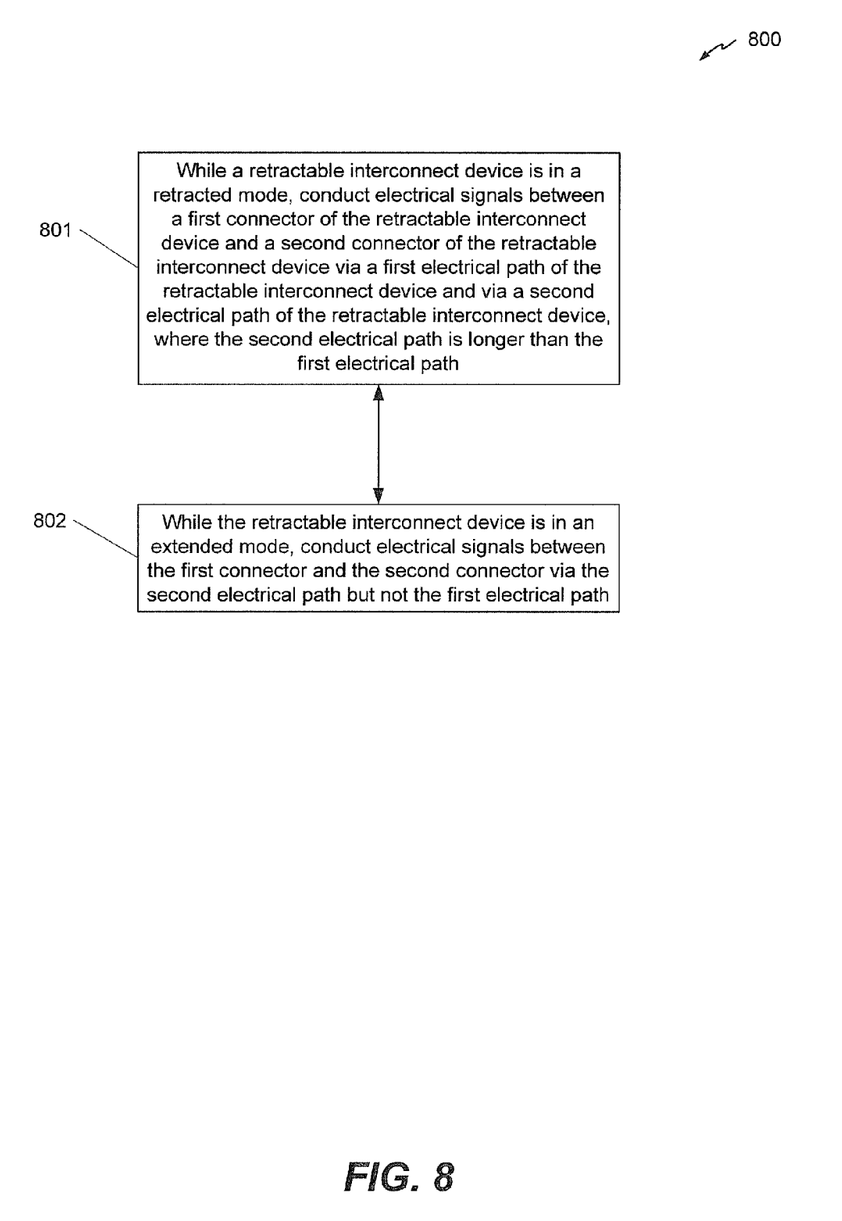
FIG. 8 is a flow chart that illustrates a particular embodiment of a method of connecting two electrical devices via a retractable interconnect device that supports communication via multiple electrical paths when operating in a retracted mode.

Referring to FIG. 8, a particular embodiment of a method of connecting electrical devices via a retractable interconnect device that enables communication via multiple electrical paths when operating in a retracted mode is disclosed and generally designated 800. In an illustrative embodiment, the method 800 may be illustrated with reference to FIGS. 3-4.

The method 800 includes, while a retractable interconnect device is in a retracted mode, conducting electrical signals between a first connector of the retractable interconnect device and a second connector of the retractable interconnect device via a first electrical path of the retractable interconnect device and via a second electrical path of the retractable interconnect device, at 801. The second electrical path is longer than the first electrical path. For example, as described with reference to FIGS. 3-4, when the retractable interconnect device 100 is in the retracted mode, both the long electrical path and the short electrical path 110 may be electrically coupled to the second connector 106 and may conduct signals between the pair of second connectors 106.

The method 800 also includes, while the retractable interconnect device is in an extended mode, conducting electrical signals between the first connector and the second connector via the second electrical path but not the first electrical path, at 802. For example, as described with reference to FIGS. 3-4, when the retractable interconnect device 100 is in the extended mode, the short electrical path 110 becomes electrically isolated from the pair of second connectors 106. The method 800 may transition between 801 and 802 based on the retraction/extension state of the retractable interconnect device 100.

Figure 9:
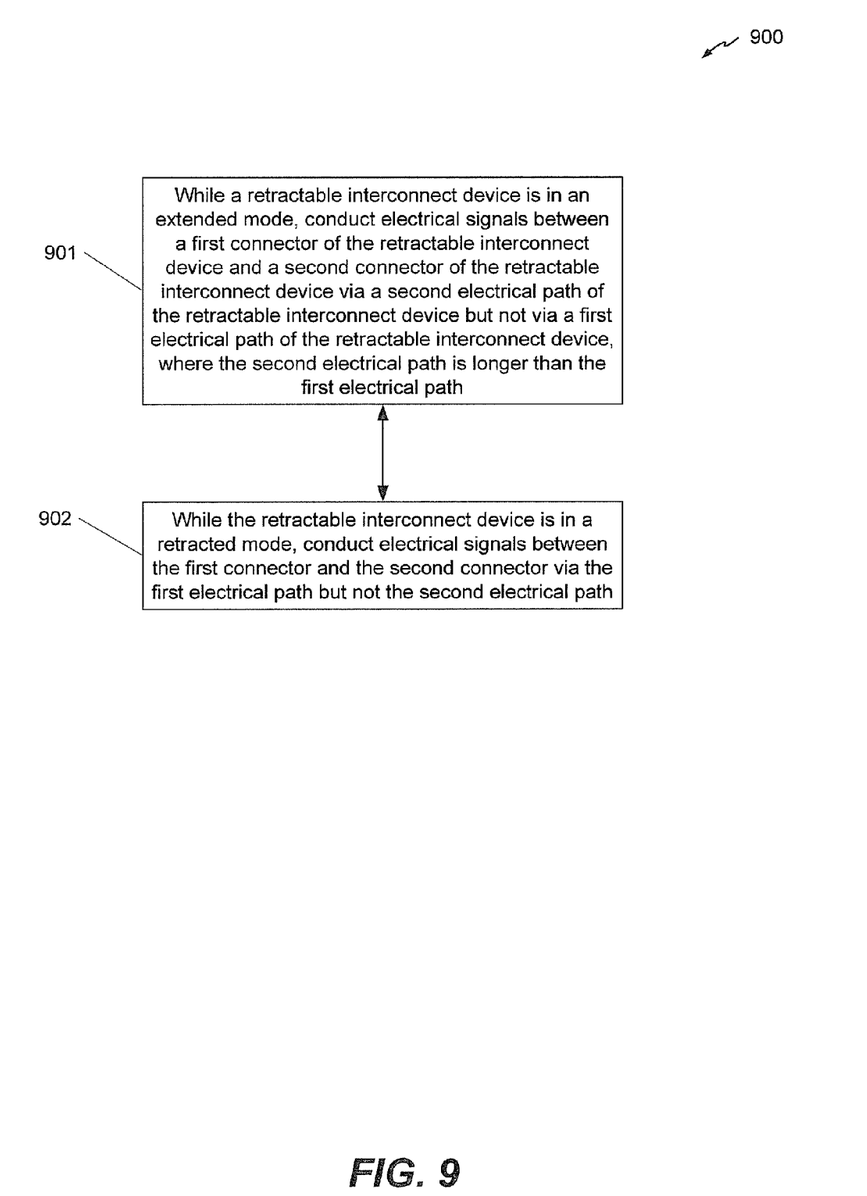
FIG. 9 is a flow chart that illustrates a particular embodiment of a method of connecting two electrical devices via a retractable interconnect device that switches communication from one electrical path to another electrical path when operating in a retracted mode.

Referring to FIG. 9, a particular embodiment of a method of connecting electrical devices via a retractable interconnect device that switches communication between electrical paths is disclosed and generally designated 900. In an illustrative embodiment, the method 900 may be illustrated with reference to FIGS. 5-6.

The method 900 includes, while a retractable interconnect device is in an extended mode, conducting electrical signals between a first connector of the retractable interconnect device and a second connector of the retractable interconnect device via a second electrical path of the retractable interconnect device but not via a first electrical path of the retractable interconnect device, at 901. The second electrical path is longer than the first electrical path. For example, as described with reference to FIGS. 5-6, in the extended mode, the short electrical path 110 may be electrically isolated from the connector pin 621 due to being removed from the receptacle 525 and the long electrical path 120 may be electrically coupled to the connector pin 621 through the conductive via 624. Thus, signals between the pair of second connectors 106 may be conducted by the long electrical path 120 but not the short electrical path 110.

The method 900 also includes, while the retractable interconnect device is in a retracted mode, conducting electrical signals between the first connector and the second connector via the first electrical path but not via the second electrical path, at 902. For example, as described with reference to FIGS. 5-6, in the retracted mode, the short electrical path 110 may be electrically coupled to the connector pin 621 and the long electrical path 120 may be electrically isolated from the connector pin 621. Thus, in a particular configuration, signals between the pair of second connectors 106 may be conducted over the short electrical path 110 but not over the long electrical path 120. The method 900 may transition between 901 and 902 based on the retraction/extension state of the retractable interconnect device 100.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
    a retractable interconnect device that is configurable to operate in an extended mode or in a retracted mode, the retractable interconnect device comprising:
        a first electrical path;
        a second electrical path that is longer than the first electrical path, wherein the second electrical path is extensible when the retractable interconnect device is in the retracted mode and is retractable when the retractable interconnect device is in the extended mode; and
        a connector that is electrically coupled to the second electrical path and that is selectively electrically couplable to the first electrical path.

2. The apparatus of claim 1, wherein the first electrical path is electrically isolated from the connector when the retractable interconnect device is in the extended mode.

3. The apparatus of claim 2, wherein the first electrical path is electrically coupled to the connector when the retractable interconnect device is in the retracted mode.

4. The apparatus of claim 1, further comprising an extending and retracting mechanism configured to cause a transition of the retractable interconnect device from the retracted mode to the extended mode and a transition of the retractable interconnect device from the extended mode to the retracted mode.

5. The apparatus of claim 1, wherein the retractable interconnect device is a component of an electrical device and is configured to connect the electrical device to another electrical device.

6. The apparatus of claim 1, wherein the connector is electrically couplable to a first electrical device and further comprising a second connector that is electrically couplable to a second electrical device.

7. The apparatus of claim 1, wherein the first electrical path comprises a first flex cable and the second electrical path comprises a second flex cable.

8. The apparatus of claim 1, wherein the first electrical path supports a higher data transmission speed than the second electrical path.

9. A retractable interconnect device, comprising:
    a short flex cable;
    a long flex cable;
    an extending and retracting mechanism configured to transition between an extended mode and a retracted mode; and
    a connector that is electrically coupled to the long flex cable and that is selectively electrically couplable to the short flex cable.

10. The retractable interconnect device of claim 9, wherein the extending and retracting mechanism comprises a winding spool.

11. The retractable interconnect device of claim 9, wherein in the retracted mode, the connector is connected to the short flex cable by a land grid array interface.

12. The retractable interconnect device of claim 9, further comprising a second connector.

13. The retractable interconnect device of claim 9, wherein the short flex cable supports a higher data transmission speed than the long flex cable.

14. The retractable interconnect device of claim 9, wherein the short flex cable and the long flex cable comprise the same number of channels.

15. The retractable interconnect device of claim 9, wherein the short flex cable and the long flex cable comprise different numbers of channels.

16. A method of interconnecting electrical devices, comprising:
    while a retractable interconnect device is in a retracted mode, conducting electrical signals between a first connector of the retractable interconnect device and a second connector of the retractable interconnect device via a first electrical path of the retractable interconnect device and via a second electrical path of the retractable interconnect device; and
    while the retractable interconnect device is in an extended mode, conducting electrical signals between the first connector and the second connector via the second electrical path but not the first electrical path.

17. The method of claim 16, wherein the second electrical path is longer than the first electrical path and wherein the retracted mode corresponds to the second electrical path of the retractable interconnect device being fully retracted.

18. The method of claim 16, wherein the extended mode corresponds to the second electrical path of the retractable interconnect device being at least partially extended.

19. The method of claim 16, wherein the retractable interconnect device includes a connector that is electrically coupled to the second electrical path and that is selectively electrically couplable to the first electrical path.

20. The method of claim 19, wherein the connector is further electrically couplable to an electrical device.

* * * * *